United States Patent
Lennen

(10) Patent No.: US 10,775,511 B2
(45) Date of Patent: Sep. 15, 2020

(54) METHOD AND APPARATUS FOR IMPROVING GNSS ACCURACY VIA PATH IDENTIFICATION

(71) Applicant: Samsung Electronics Co., Ltd., Suwon-si, Gyeonggi-do (KR)

(72) Inventor: Gary Lennen, Cupertino, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 483 days.

(21) Appl. No.: 15/584,017

(22) Filed: May 1, 2017

(65) Prior Publication Data

US 2018/0231666 A1 Aug. 16, 2018

Related U.S. Application Data

(60) Provisional application No. 62/458,563, filed on Feb. 13, 2017.

(51) Int. Cl.
*G01S 19/22* (2010.01)
*G01S 19/42* (2010.01)

(52) U.S. Cl.
CPC ............ *G01S 19/22* (2013.01); *G01S 19/426* (2013.01)

(58) Field of Classification Search
CPC ........ G01S 19/09; G01S 19/22; G01S 19/426; G01S 19/428
See application file for complete search history.

(56) References Cited

U.S. PATENT DOCUMENTS

| | | | | |
|---|---|---|---|---|
| 4,809,005 A | * | 2/1989 | Counselman, III | G01C 15/00 342/352 |
| 6,184,826 B1 | * | 2/2001 | Walley | H01Q 3/267 342/360 |
| 6,556,615 B1 | | 4/2003 | Pon | |
| 7,577,445 B2 | | 8/2009 | Guvenc et al. | |
| 8,416,863 B2 | | 4/2013 | Raman et al. | |
| 10,168,414 B2 | * | 1/2019 | Chen | G01S 5/0252 |
| 2002/0126044 A1 | * | 9/2002 | Gustafson | G01C 21/165 342/357.59 |
| 2009/0303067 A1 | * | 12/2009 | Sharp | G01C 21/206 340/686.1 |
| 2016/0290805 A1 | | 10/2016 | Irish et al. | |
| 2017/0212210 A1 | * | 7/2017 | Chen | G01S 5/06 |

* cited by examiner

*Primary Examiner* — Dao L Phan
(74) *Attorney, Agent, or Firm* — Renaissance IP Law Group LLP

(57) ABSTRACT

A Global Navigation Satellite System (GNSS) receiver includes a wideband signal correlator and a multipath mitigator. The wideband signal correlator generates wideband correlation signals of at least one of a plurality of GNSS signals with respect to corresponding locally generated code replica signals in which a bandwidth of the wideband signal correlation module is at least about 20 MHz. The multipath mitigator determines a Line of Sight (LOS) signal from the wideband correlation signals. The GNNS receiver may include a narrowband signal correlator to generate narrowband correlation signals of the at least one GNSS signal with respect to corresponding locally generated code replica signals in which a bandwidth of the narrowband signal correlation module is less than about 6 MHz. The multipath mitigator further corrects a range and range-rate measurement generated from the narrowband correlation signals based on a code phase and a carrier estimated based on the LOS signal.

12 Claims, 16 Drawing Sheets

METHOD AND APPARATUS FOR IMPROVING GNSS ACCURACY VIA PATH IDENTIFICATION

CROSS-REFERENCE TO RELATED APPLICATION

This patent application claims the priority benefit under 35 U.S.C. § 119(e) of U.S. Provisional Patent Application No. 62/458,563, filed on Feb. 13, 2017, the disclosure of which is incorporated herein by reference in its entirety.

TECHNICAL FIELD

The subject matter disclosed herein generally relates to Global Navigation Satellite System (GNSS) devices, and more particularly, to a system and a method that mitigates the influence of Non-Line of Sight (NLOS) signal components on the code-tracking function and carrier-tracking function of a GNSS receiver by identifying individual Line of Sight (LOS) and NLOS signal components.

BACKGROUND

Multipath signals received at a Global Navigation Satellite System (GNSS) receiver are a primary source of position-solution error. Such multipath signals are prevalent in challenging environments, such as urban canyons. Multipath signals received at the antenna of a GNSS receiver typically include LOS satellite signals and NLOS satellite signals that are caused by, for example, reflections. Additionally, LOS signal components may be present or may be blocked, and there may be zero or any number of NLOS signal components regardless whether a LOS signal is present. A NLOS signal component may be characterized by having a phase and an amplitude that is offset with respect to a LOS signal. The delay associated with NLOS signal components directly influence the code-tracking function in a receiver and, hence, influences the range error. Total or partial tracking of NLOS components also leads to corruption of a range-rate measurement at a receiver. Further, if a GNSS receiver is moving (or a reflective object is moving), there may also be a rate component (an error) between LOS and NLOS components.

SUMMARY

One example embodiment provides a GNSS receiver that includes a wideband signal correlation module and a multipath-mitigation module. The wideband signal correlation module may generate wideband correlation signals of at least one of a plurality of GNSS signals with respect to corresponding locally generated code replica signals in which a bandwidth of the wideband signal correlation module may be at least about 20 MHz. The multipath-mitigation module may determine an LOS signal component from the wideband correlation signals. In one example embodiment, the multipath-mitigation module may determine the LOS signal component based on a peak value of a high-resolution power (HRP) function and a zero-crossing of a high-resolution code (HRC) function, in which the HRP function may include:

$$HRP(\tau) = |p(\tau) - [p(\tau-n) + p(\tau+n)]|,$$

and in which p may be a value of correlation power for a given delay $\tau$, n may be a number of samples offset from $\tau$, and the value of p may be determined by taking a magnitude of an in-phase (I) correlation and a quadrature (Q) correlation as, $$p(\tau) = \sqrt{I(\tau)^2 + Q(\tau)^2}, \text{ and}$$

in which the HRC function may include:

$$HRC(\tau) = 2[p(\tau-m) + p(\tau+m)] - [p(\tau-2m) + p(\tau+2m)],$$

in which p may be the value of correlation power for a given delay $\tau$, and m may be a number of samples offset from $\tau$.

One example embodiment provides a method to generate a range and range-rate measurement in a GNSS that may include: sampling at least one of a plurality of GNSS signals; forming a wideband signal for the at least one sampled GNSS signal; correlating the wideband signal with respect to at least one corresponding locally generated code replica signal; determining a LOS signal component based on the correlated wideband signal; estimating a code phase and a carrier based on the LOS signal component; and generating a range and range-rate measurement based on the estimated code phase and the estimated carrier.

One example embodiment provides a GNSS receiver that may include a wideband signal path and a multipath-mitigation module. The wideband signal path may form wideband correlations of at least one of a plurality of GNSS signals with respect to corresponding locally generated code replica signals in which a bandwidth of the wideband signal path may be about 20 MHz. The multipath-mitigation module may be coupled to the wideband signal path and may determine a Line of Sight (LOS) signal component from the wideband correlated signals.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
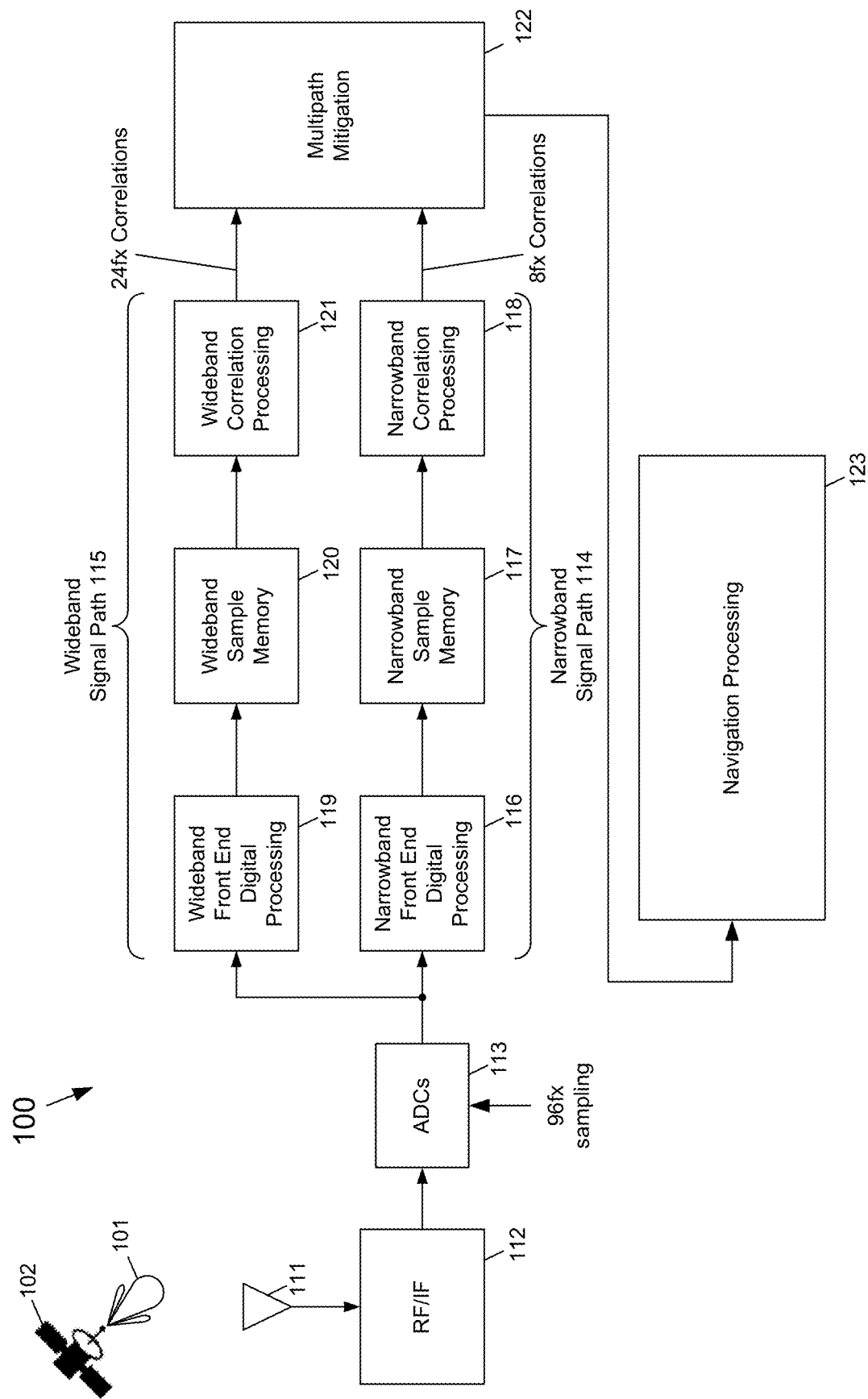
FIG. 1 depicts a GNSS receiver that provides multipath mitigation by identifying signals based on their apparent signal path according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. For example, the term "mod" as used herein means "modulo." It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The term "software," as applied to any implementation described herein, may be embodied as a software package, code and/or instruction set or instructions. The term "hardware," as applied to any implementation described herein, may include, for example, singly or in any combination, hardwired circuitry, programmable circuitry, state-machine circuitry, and/or firmware that stores instructions executed by programmable circuitry. The modules may, collectively or individually, be embodied as software, firmware and/or hardware that forms part of a larger system, such as, but not limited to, an integrated circuit (IC), system on-chip (SoC) and so forth.

The subject matter disclosed herein provides a system and a method that mitigates the influence of NLOS signal components on the code-tracking function of a GNSS receiver by identifying and tracking (in code and by carrier) individual LOS and NLOS signal components, thereby improving range and range-rate measurements made by the receiver. In one embodiment, the subject matter disclosed herein uses the full transmit bandwidth ($\approx$20.46 MHz) of a satellite to provide multipath mitigation. In one embodiment, the subject matter disclosed herein allows estimation of LOS and NLOS signal components in a multipath environment that may be used as an input estimate to a navigation process. In one embodiment, an indication of a challenging multipath environment as determined by the subject matter disclosed herein may lead to weighting a Dead Reckoning (DR) navigation solution more with respect to GPS measurements.

Although the subject matter disclosed herein will be described with respect to the GPS L1 Coarse/Acquisition (C/A) code signal, it should be understood that the techniques disclosed herein are applicable to other GNSS systems. In one embodiment, other signals (such as L5) may be used to identify individual L1 C/A code multipath components for the purpose of initiating individual acquisition and tracking of the L1 components. Although the subject matter disclosed herein is described in connection with a GPS-based system, it should be understood that the disclosed subject matter is applicable to other GNSS systems, such as, but not limited to, GLONASS, BeiDou, Galileo, a Quasi-Zenith Satellite System (QZSS), and a Satellite-Based Augmentation System (SBAS).

FIG. 1 depicts a GNSS receiver 100 that provides multipath mitigation by identifying signals based on their apparent signal path according to the subject matter disclosed herein. In one embodiment, the GNSS receiver 100 provides multipath mitigation by identifying a LOS signal in the presence of one or more NLOS signals. The GNSS receiver 100 receives GNSS signals 101 transmitted from a plurality of GNSS satellites 102, of which only one satellite is shown. The GNSS receiver 100 includes an antenna 111, a radio frequency/intermediate frequency (RF/IF) module 112, and an analog-to-digital converter (ADC) module 113. The antenna 111 receives the GNSS signals 101, and the RF/IF processing module 112 downconverts the GNSS signals 101 to an intermediate frequency.

The ADC module 113 samples the downconverted GNSS signals. In one embodiment, the ADC module 113 samples the downconverted GNSS signals at a sampling frequency of 96 fx in which fx=1.0230625 MHz. The output of the ADC module 113 may contain all available GNSS signals 101. That is, I and Q equivalent signals for all received satellite signals 101 may be available from the output of the ADC module 113. In that regard, it should also be understood that there may be I and Q equivalent signals that are available at least all the way through to the multipath-mitigation module 122.

The output of the ADC module 113 is input to a narrowband signal path 114 and a wideband signal path 115. In one embodiment, the bandwidth of the narrowband signal path 114 may be about 2 MHz. The narrowband signal path 114 may correspond to the signal path that is found in a conventional 2 MHz bandwidth signal path in commercially available GNSS receivers. In another embodiment, the bandwidth of the narrowband signal path 114 may selectively changed from about 2 MHz to be about 6 MHz. In one embodiment, the wideband signal path 115 may have a bandwidth of about 20.46 MHz.

In one embodiment of the GNSS receiver 100, wideband and narrowband signal paths may be used that are operational in parallel. In another embodiment, a switchable single wideband/narrowband path may be used that may be switched depending on a receiver mode, such as whether the receiver is in an urban canyon environment or is in a relatively multipath-free environment.

Figure 2:
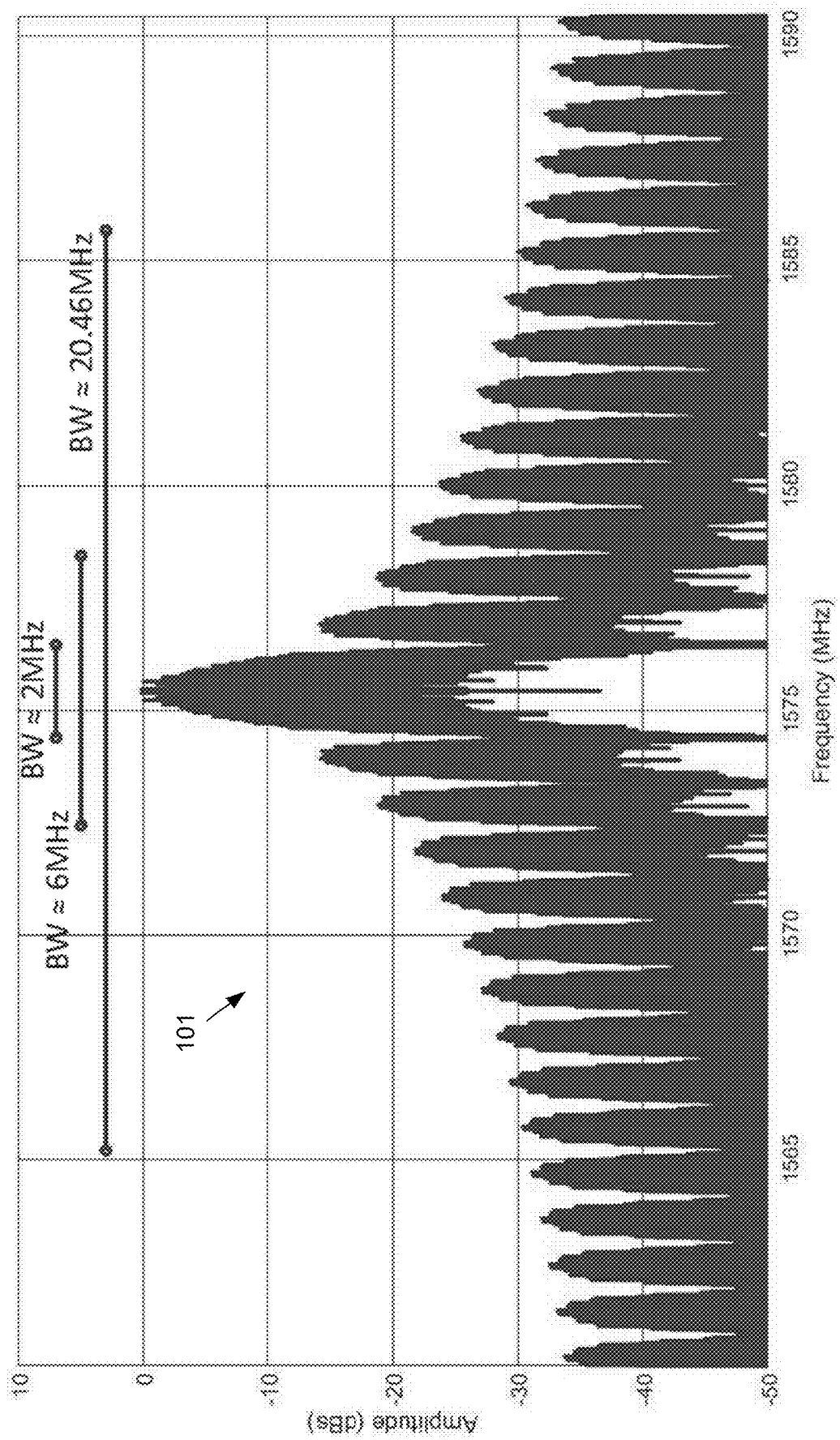
FIG. 2 depicts a frequency-domain representation of a GNSS signal that has a bandwidth that is greater than 20 MHz.

FIG. 2 depicts a frequency-domain representation of a GNSS signal 101, which has a bandwidth that is greater than 20 MHz. FIG. 2 also depicts the portion of the GNSS signal 101 covered by a narrowband signal path 114 of about a 2 MHz, a narrow bandwidth signal path 114 of about a 6 MHz, and a wideband signal path 115 of about a 20.46 MHz, as defined in "Global Position Systems Directorate Systems Engineering & Integration, Interface Specification IS-GPS-200, IS-GPS-200H, 24 Sep. 2013, which is incorporated by reference herein.

Referring back to FIG. 1, the narrowband signal path 114 includes a narrowband front end digital processing module 116, a narrowband sample memory module 117, and a narrowband correlation processing module 118. The narrowband front end digital processing module 116 provides the conventional functions of interference mitigation and separation of GNSS (i.e., GPS) signal components (i.e., in-phase (I) and quadrature (Q)). The narrowband sample memory module 117 stores the signal samples that have been output from the narrowband front end digital processing module 116. In one embodiment, the signal samples stored in the narrowband sample memory module 117 are stored at an 8 fx sample rate. In another embodiment, the sample rate for the narrowband signal path 114 may be different from 8 fx, but, in general, the sampling rate should satisfy the Nyquist sampling theorem for the given bandwidth. The output of the narrowband sample memory module 117 is processed further in the narrowband correlation processing module 118 by providing I and Q correlation operations between, for example, a GPS L1 C/A signal of the received satellite signals 101 and a locally generated C/A code replica (not shown). The I and Q correlations from the narrowband signal path 114 may be used to perform a number of standard functions in the GNSS receiver 100 including code and carrier tracking from which measurements including range and range-rate measurements, data decode, and carrier-to-noise (CNO) measurement are generated.

The wideband signal path 115 includes a wideband front end digital processing module 119, a wideband sample memory module 120, and a wideband correlation processing module 121. The wideband front end digital processing module 119 provides interference mitigation and separation of GNSS signal components (i.e., I and Q). The wideband sample memory module 120 stores the signal samples that have been output from the wideband front end digital processing module 119. In one embodiment, the signal samples stored in the narrowband sample memory module 117 are stored at a 24 fx sample rate. In another embodiment, the sample rate for the wideband signal path 115 may be different from 24 fx, but, in general, the sampling rate should again satisfy the Nyquist sampling theorem for the given bandwidth. The output of the wideband sample memory module 120 is further processed in the wideband correlation processing module 121 by providing a correlation operation between, for example, a GPS L1 C/A signal of the received satellite signals 101 and a locally generated C/A code replica (not shown).

The outputs of the narrowband correlation processing module 118 and the wideband correlation processing module 121 are input to a multipath-mitigation module 122 that provides multipath mitigation by identifying LOS signals and NLOS signals. The output of the multipath-mitigation module 122 is provided to a navigation-processing module 123, which generates standard positioning and navigation information.

Figure 3:
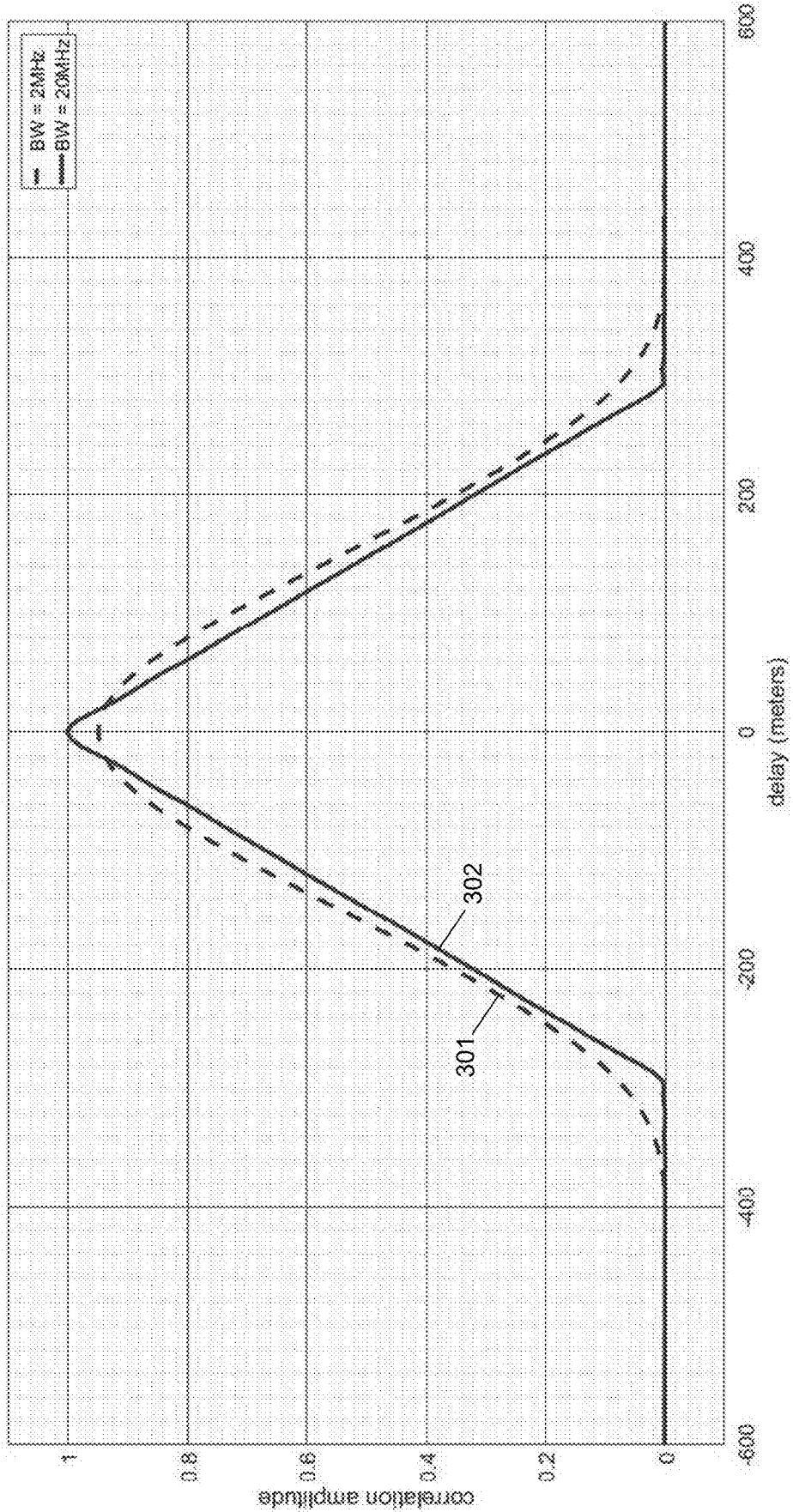
FIG. 3 depicts a graph of examples of normalized coarse/acquisition correlation amplitudes for a 2 MHz narrowband signal path and for a 20 MHz wideband signal path.

FIG. 3 depicts a graph of examples of normalized C/A correlation amplitudes for a 2 MHZ narrowband signal path and for a 20 MHz wideband signal path. In FIG. 3, the abscissa is delay in meters, and the ordinate is the normalized correlation amplitude. The dashed curve 301 in FIG. 3 represents the normalized C/A correlation amplitude for a 2 MHZ narrowband signal path, and the solid curve 302 represents the normalized C/A correlation amplitude for a 20 MHz wideband signal path. As can be seen FIG. 3, there is some signal loss (or difference) between the narrowband case and the wideband case because the narrowband case appears to be more rounded. Although the differences between the narrowband correlation and the wideband correlation may appear to be small, the subject matter disclosed herein utilizes the differences to identify signals based on their apparent signal path and to provide multipath mitigation that may be used to improve range and range rate measurements. It should also be noted that although FIG. 3 depicts only one correlation signal for the narrowband signal path and only one correlation signal for the wideband signal path, it should be understood there may actually be two correlation signals (I and Q) for each signal path for a given satellite signal 101.

The multipath-mitigation module 122 may use the wideband I and Q correlations to determine the following three functions that may be used for identifying LOS signals and NLOS signals. A first function that may be determined by the multipath-mitigation module 122 is a High Resolution Power (HRP) function. The HRP function may be defined as $$HRP(\tau)=|p(\tau)-[p(\tau-n)+p(\tau+n)]|, \quad (1)$$

in which p is the value of correlation power for a given delay $\tau$, and n is the number of samples offset from $\tau$. For example, the value of HRP($\tau$) for n=1 may be computed by using the correlation power value at HRP($\tau$) and subtracting the sum of the correlation power values immediately adjacent (i.e., ±one sample) to the correlation power value at HRP($\tau$).

The value of p may be determined by taking the magnitude of the I and Q correlations, as, $$p(\tau)=\sqrt{I(\tau)^2+Q(\tau)^2}. \quad (2)$$

In one embodiment, p($\tau$) may be determined across 20 ms (for GPS) and the further summed across, for example, 1 s to improve the SNR before determining HRP($\tau$). It should be understood that other coherent integration times may be used alternatively or in addition to 20 ms, for example, 100 ms.

A second function that may be determined by the multipath-mitigation module 122 is a High Resolution Code (HRC) function. The HRC function may be defined as $$HRC(\tau)=2[p(\tau-m)+p(\tau+m)]-[p(\tau-2m)+p(\tau+2m)], \quad (3)$$

in which p is the value of correlation power for a given delay $\tau$, and m is the number of samples offset from $\tau$.

The third function that may be determined by the multipath-mitigation module 122 is a High Resolution Carrier Component (HRCC) function. The HRCC function may be defined as $$HRCC(\tau) = \tan^{-1}\left(\frac{Q(\tau)}{I(\tau)}\right), \quad (4)$$

in which $Q(\tau)=Q(\tau)-[Q(\tau-1)+Q(\tau+1)]$ and $I(\tau)=I(\tau)-[I(\tau-1)+I(\tau+1)]$.

Figure 4A:
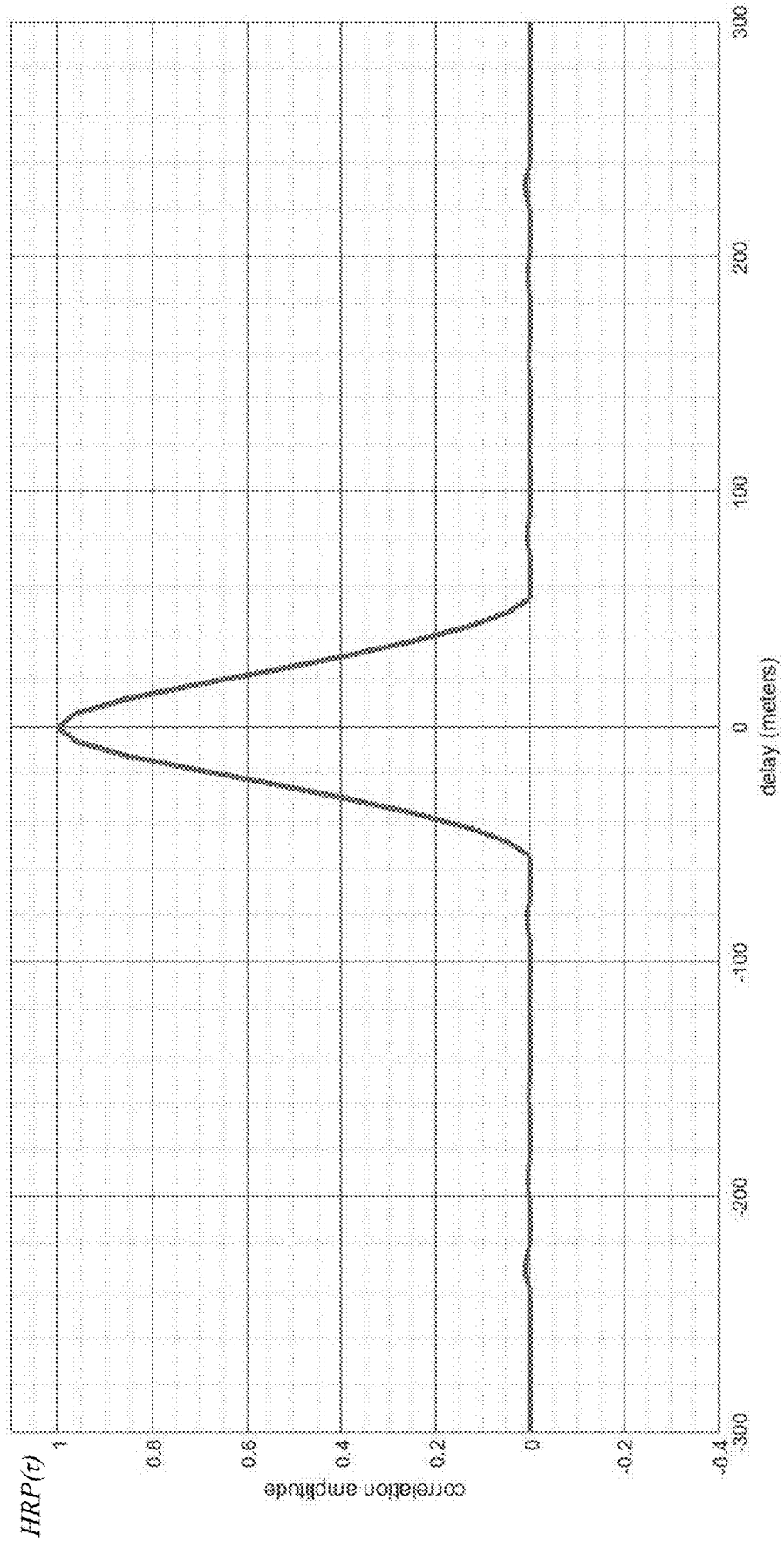
FIG. 4A depicts an example of a High-Resolution Power function according to the subject matter disclosed herein in the presence of no multipath signals.
Figure 4B:
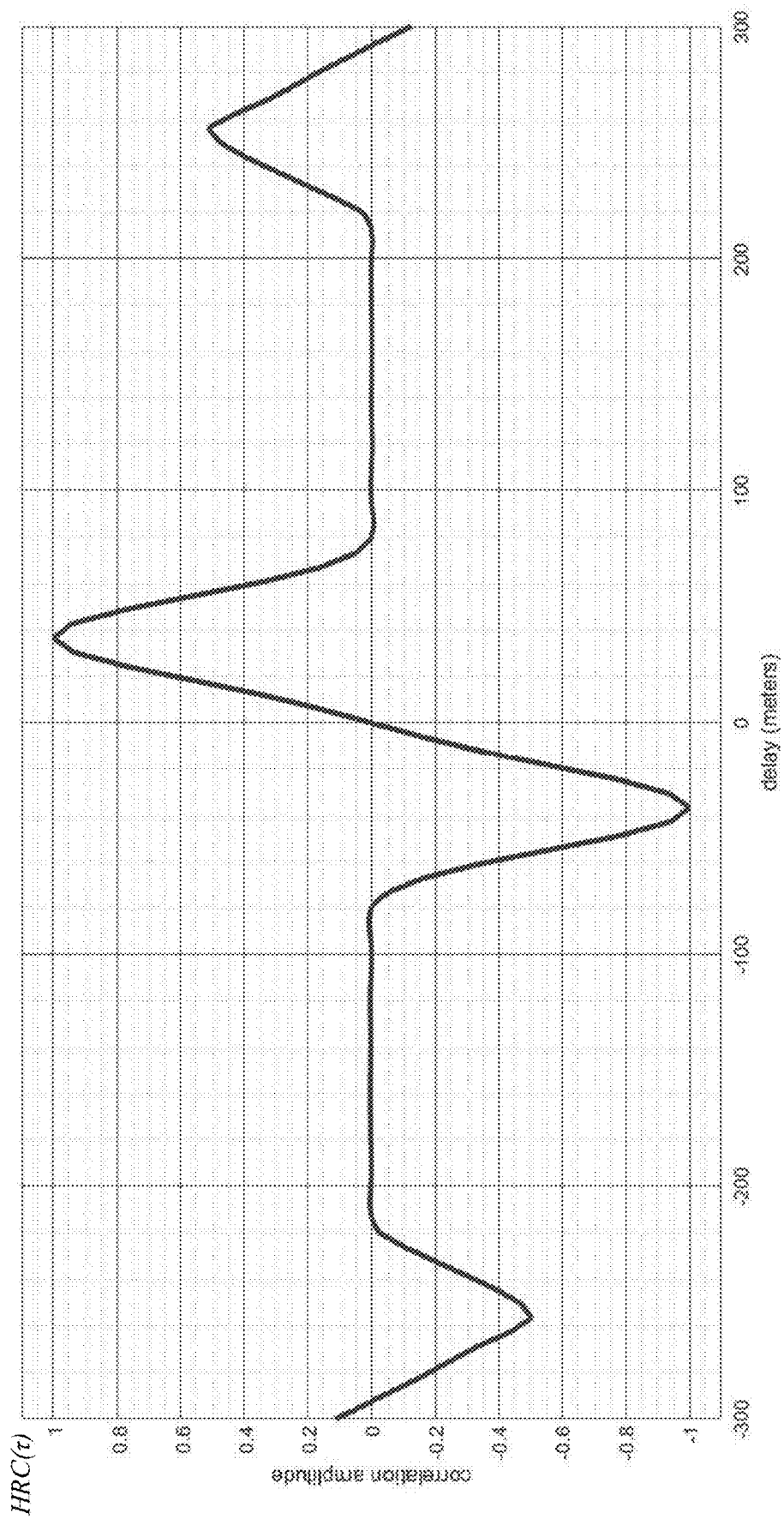
FIG. 4B depicts an example of a High-Resolution Code function according to the subject matter disclosed herein in the presence of no multipath signals.
Figure 4C:
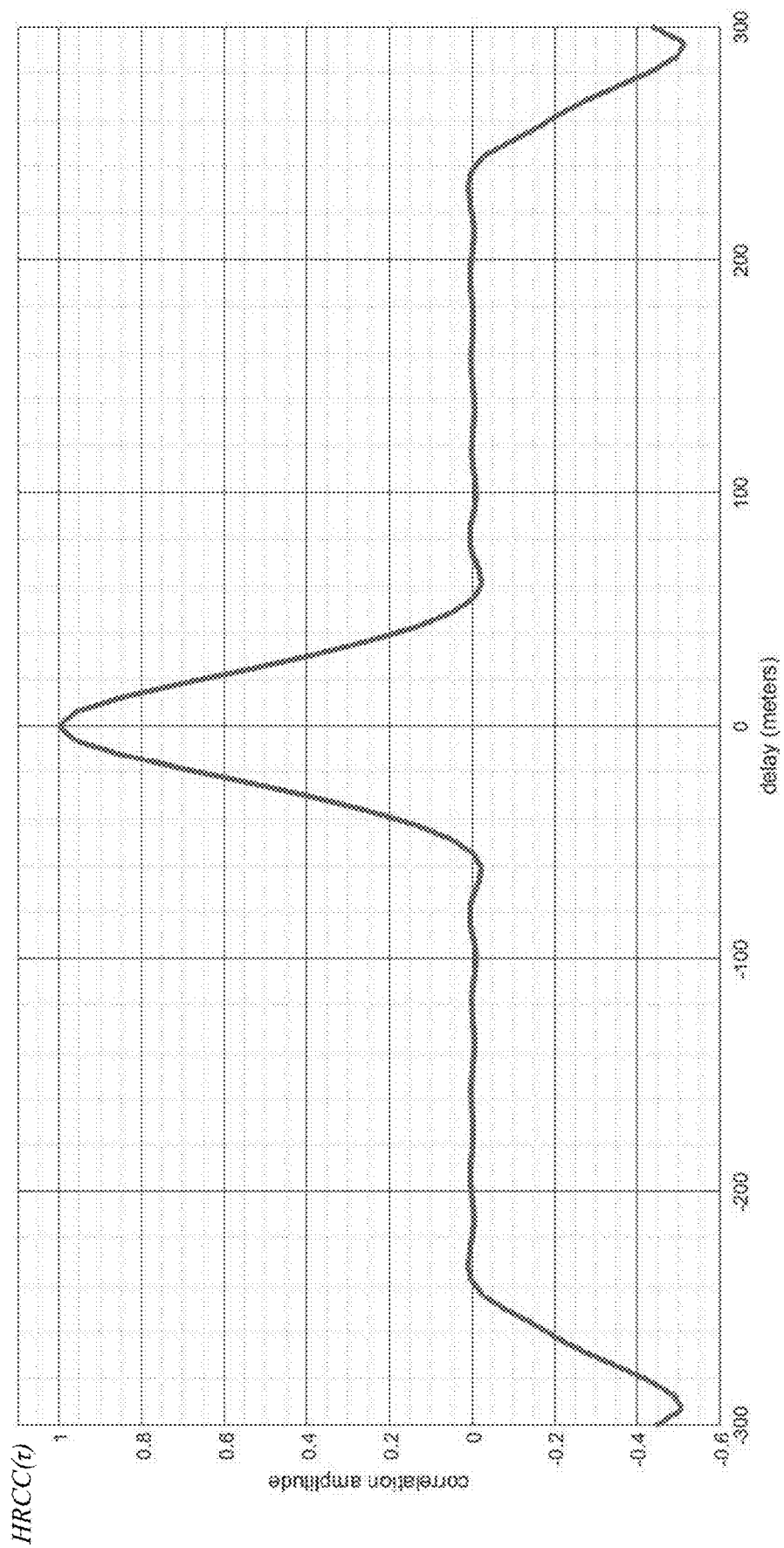
FIG. 4C depicts an example of a High-Resolution Carrier Component function according to the subject matter disclosed herein in the presence of no multipath signals.
Figure 4D:
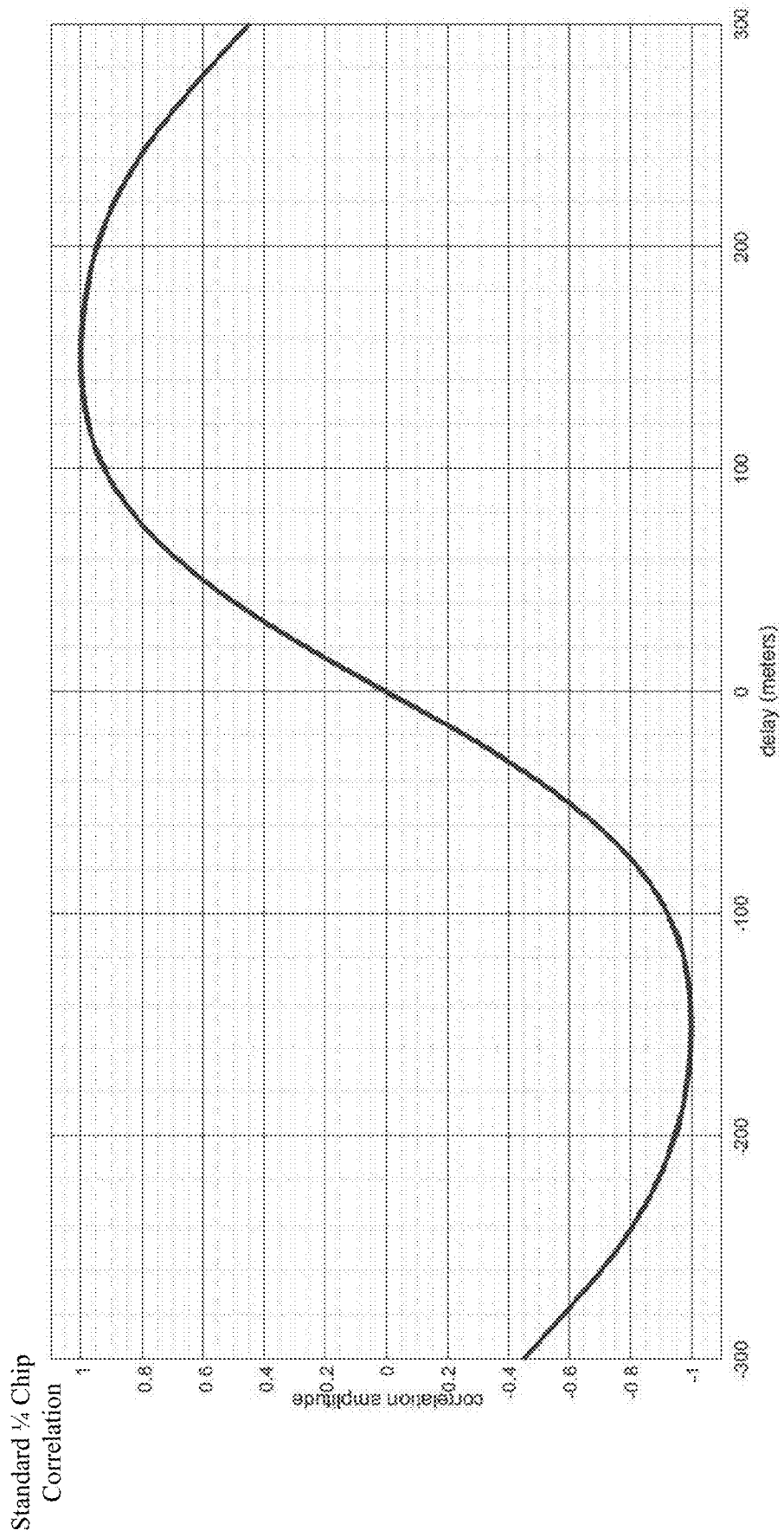
FIG. 4D depicts an example of a standard ¼ chip correlation provided by a conventional narrowband GNSS receiver in the presence of no multipath signals.

FIG. 4A depicts an example of the HRP function in the presence of no multipath signals. FIG. 4B depicts an example of the HRC function in the presence of no multipath signals. FIG. 4C depicts an example of the HRCC function in the presence of no multipath signals. FIG. 4D depicts an example of a standard ¼ chip correlation provided by a conventional narrowband GNSS receiver in the presence of no multipath signals. It should be noted that in the presence of no multipath signals, the HRP and the HRCC functions both include a peak at a delay of 0 m (i.e., $\tau$=0) and the HRC function includes a zero crossing at a delay of 0 m. It should also be noted that in the presence of no multipath signals, the conventional ¼ chip correlation function depicted in FIG. 4D also includes a zero crossing at a delay of 0 m.

In one embodiment, the multipath-mitigation module 122 may distinguish a LOS signal from NLOS signals, i.e., multipath signals, and track individual LOS signals and NLOS signals using the HRP, HRC and HRCC functions.

The HRP, HRC and the HRCC functions may also be searched in the frequency domain for frequency isolated LOS and NLOS components.

Figure 5:
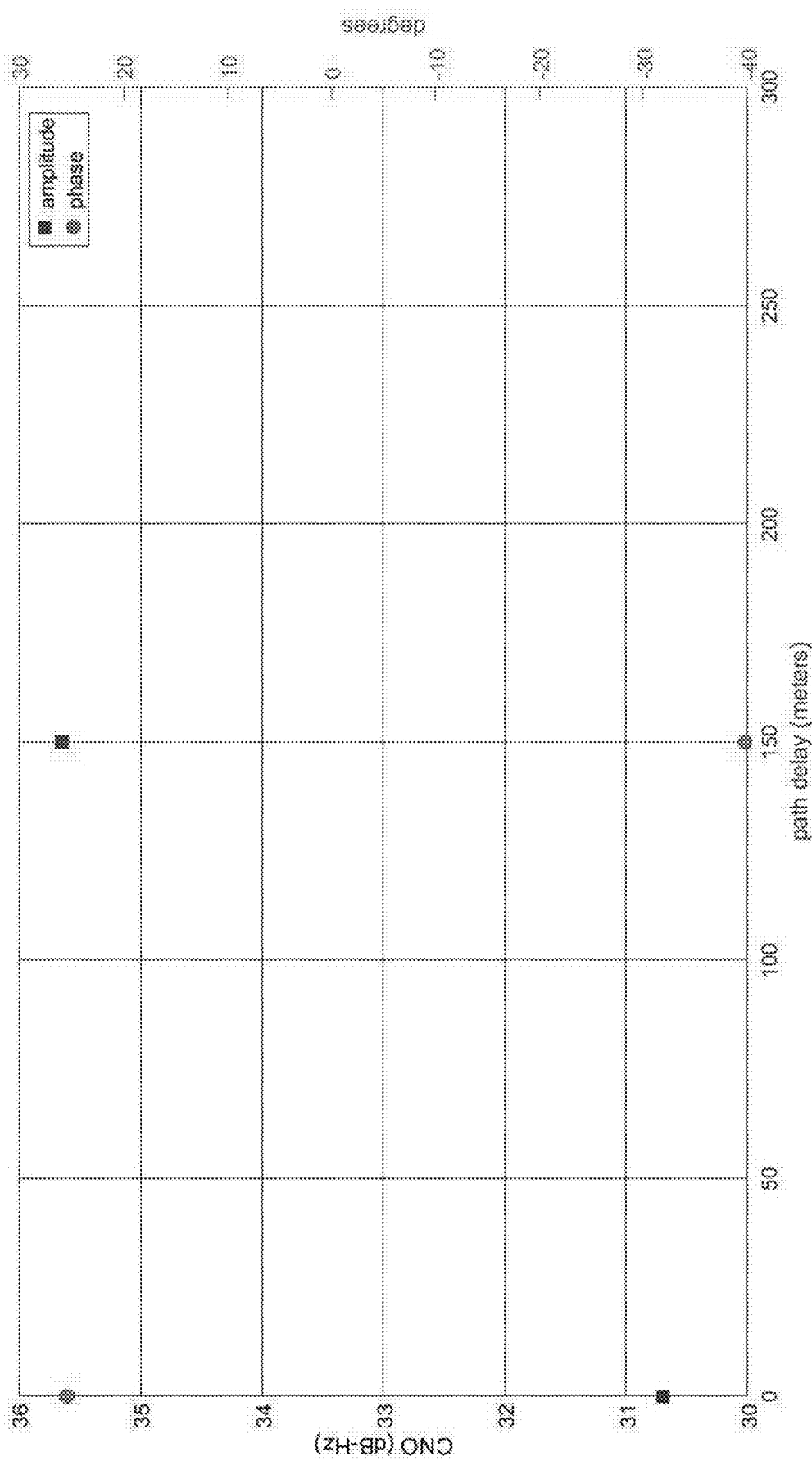
FIG. 5 is a graphical depiction of an example multipath environment having one LOS signal and one NLOS signal.

FIG. 5 is a graphical depiction of an example multipath environment having one LOS signal and one NLOS signal in which the NLOS signal has a delay of 150 m with respect to the LOS signal. The LOS signal in FIG. 5 has a CNO ratio of about 30.7 dB-Hz and a phase of about +28 degrees, and the NLOS signal has a CNO ratio of about 38 dB-Hz and a phase of about −40 degrees. For this example environment, the NLOS signal is about 7 dB-Hz stronger than the LOS signal.

Figure 6A:
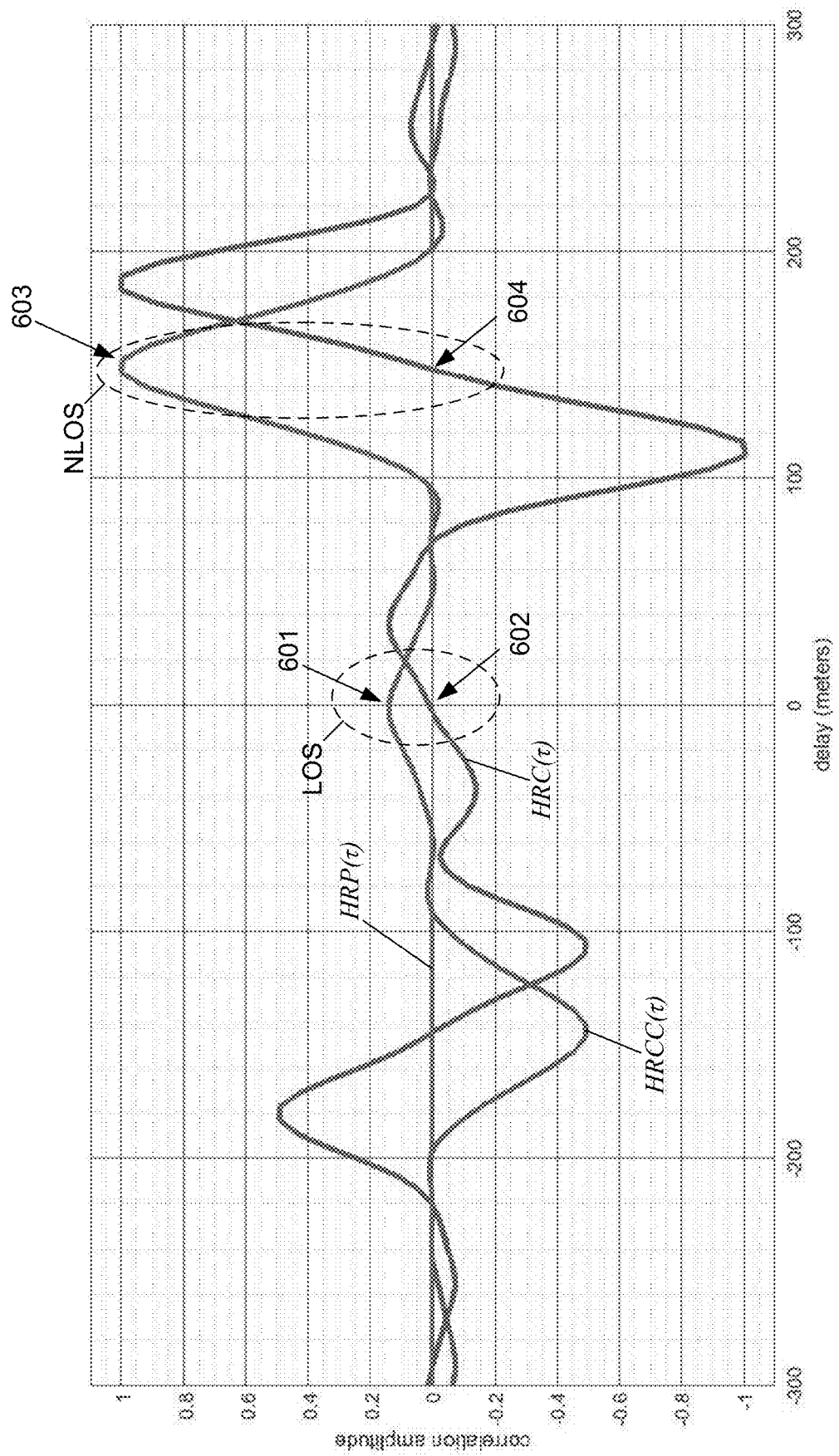
FIG. 6A depicts examples of the High-Resolution Power function, the High-Resolution Code function and the High-Resolution Carrier Component function as a function of delay in meters for the example multipath environment of FIG. 5.

FIG. 6A depicts examples of the HRP, the HRC and the HRCC functions as a function of delay in meters for the example multipath environment of FIG. 5. As can be seen in FIG. 6A, there is a peak 601 of both the HRP and the HRCC functions at 0 m delay, and a zero crossing 602 of the HRC function near the 0 m delay. There also a peak 603 of the HRP and the HRCC functions at about 150 m delay, and a zero crossing 604 of the HRC function near the 150 m delay. The earliest-in-time quality of the peak 601 of the HRP and the HRCC functions at 0 m delay and the zero crossing 602 of the HRC functions near the 0 m delay identify the LOS signal, as indicated by a dashed oval labeled LOS. The peak 603 of the HRP and the HRCC functions at about 150 m delay, and the zero crossing 604 of the HRC function near the 150 m delay identify the NLOS, as indicated by a dashed oval labeled NLOS. It may be noted that the relatively large NLOS component at about 150 m delay impacts the LOS signal, however, the impact is significantly reduced in comparison to a standard ¼ chip correlation provided by a conventional narrowband GNSS receiver.

Figure 6B:
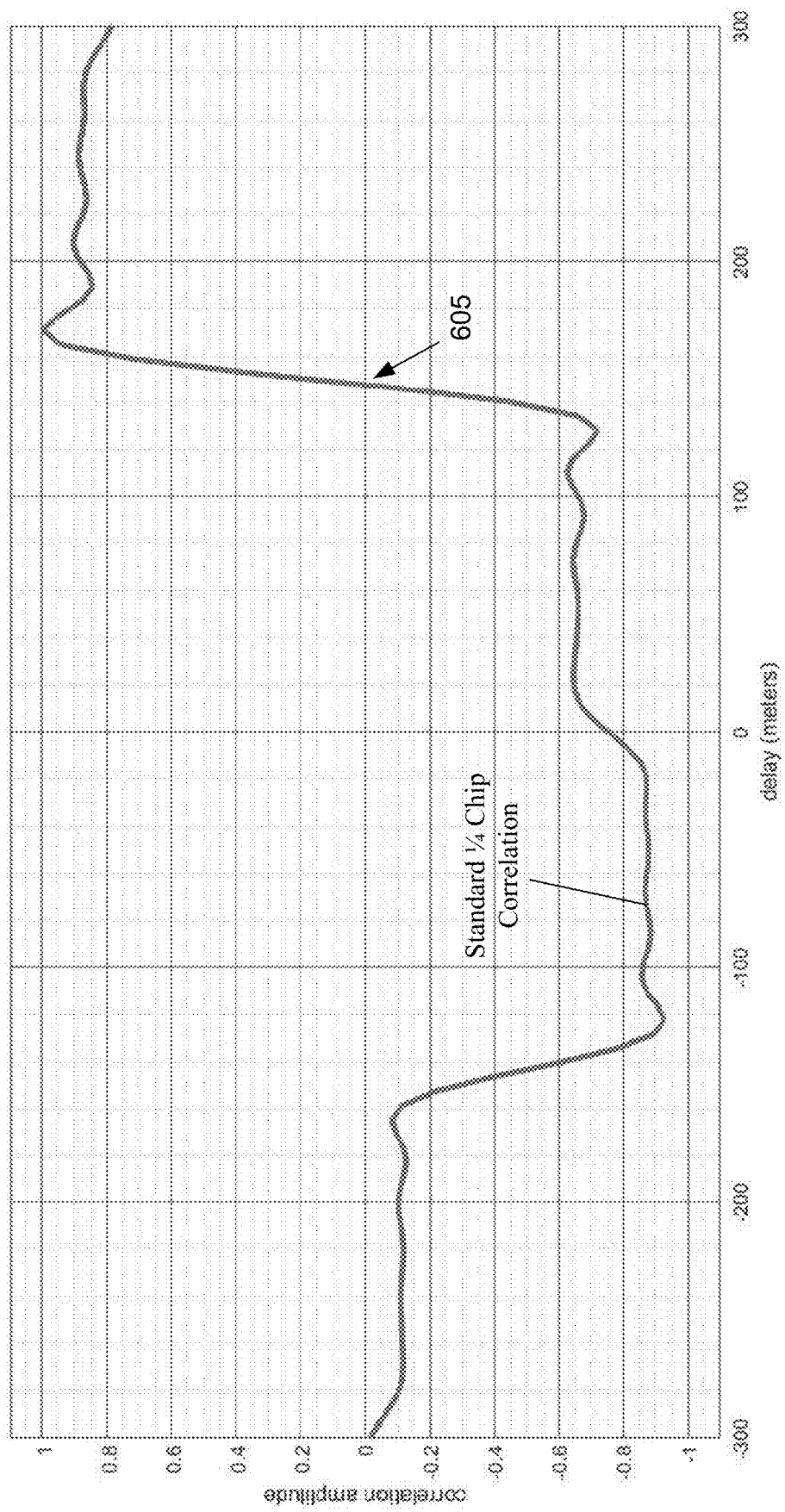
FIG. 6B depicts an example of a standard ¼ chip correlation provided by a conventional narrowband GNSS receiver as a function of delay in meters for the example multipath environment of FIG. 5.

In contrast to FIG. 6A, FIG. 6B depicts an example of a standard ¼ chip correlation provided by a conventional narrowband GNSS receiver as a function of delay in meters for the example multipath environment of FIG. 5. As can be seen in FIG. 6B, the zero crossing of the standard ¼ chip correlation is adversely impacted by the presence of the example NLOS signal of FIG. 5. That is, the zero crossing 605 of the standard ¼ chip correlation function has shifted, or delayed, to cross zero at about 165 m.

Figure 7A:
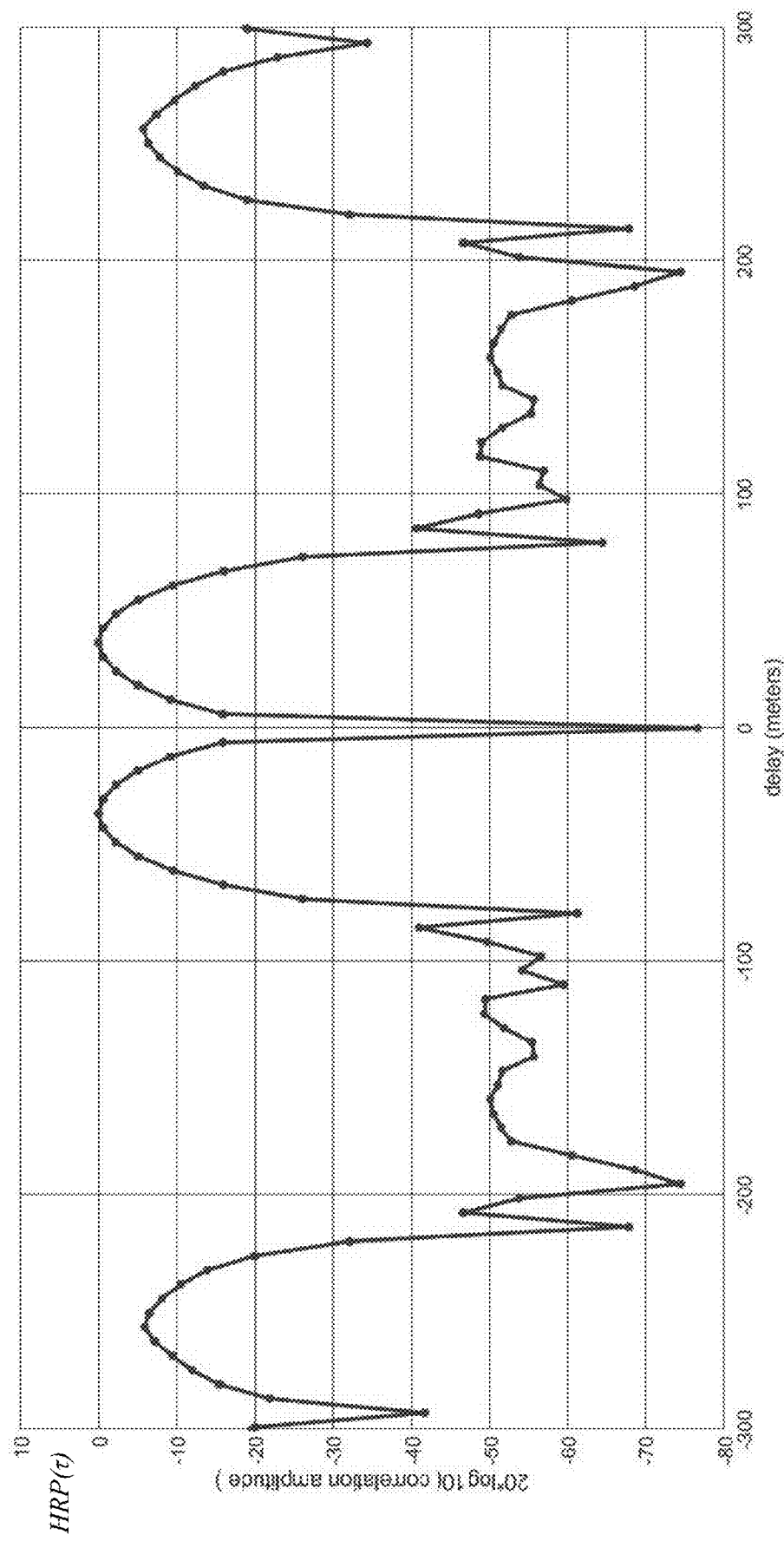
FIG. 7A is a graph that depicts the High-Resolution Code function power as a function of delay in meters for a LOS signal according to the subject matter disclosed herein.
Figure 7B:
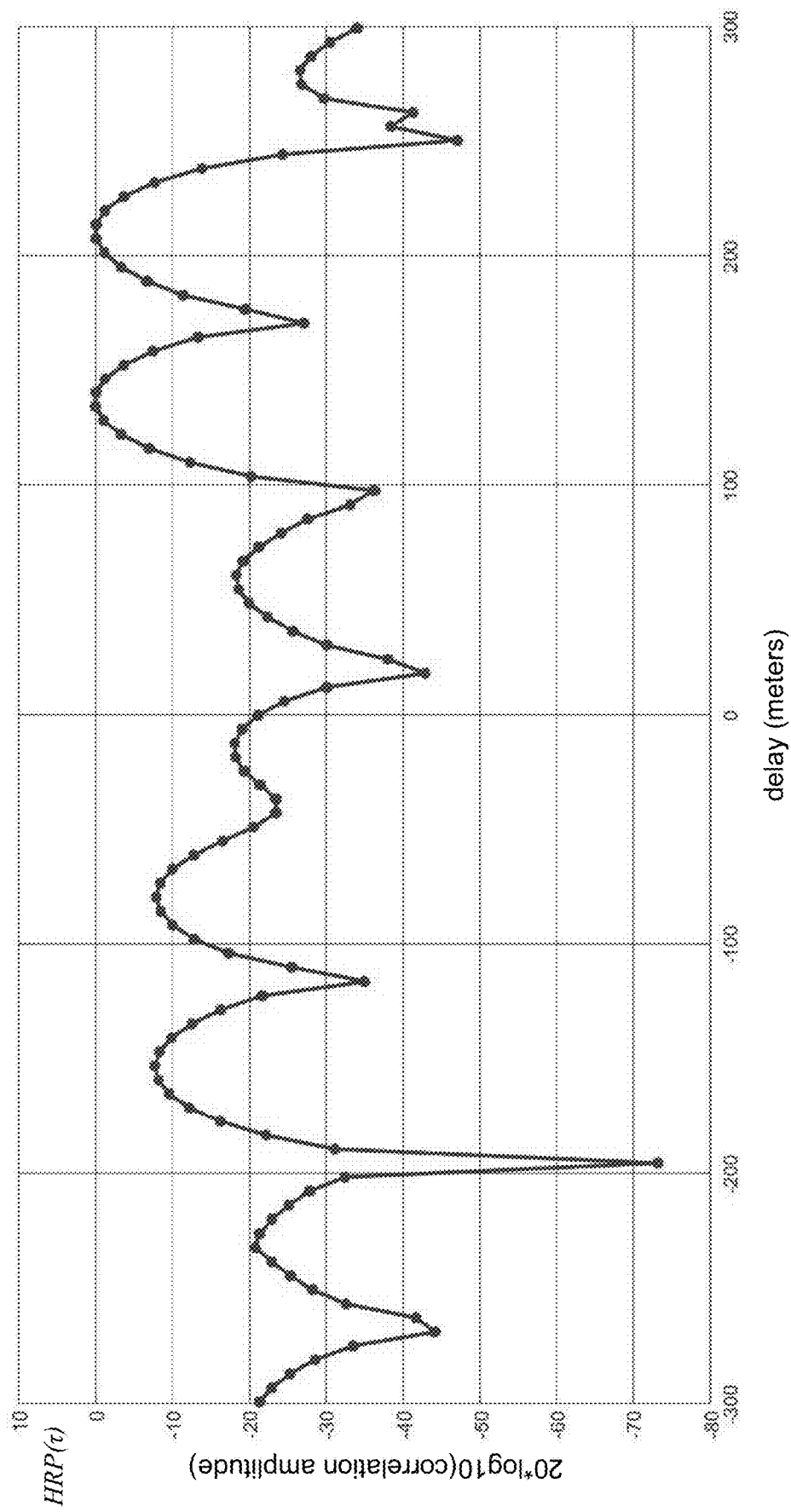
FIG. 7B is a graph that depicts the High-Resolution Code function power as a function of delay in meters for a LOS signal and a NLOS signal according to the subject matter disclosed herein.

FIG. 7A is a graph that depicts the HRC function power as a function of delay in meters for an LOS signal according to the subject matter disclosed herein. As can be seen in FIG. 7A, the power of the HRC function drops off rapidly as delay increases. In particular, at 0 delay with no NLOS signal present (i.e., an LOS signal only), the HRC function has an amplitude of about −76 dB. This can also be observed in FIG. 4A in which the zero crossing of the HRC function is about coincident with the peak of the HRP function. If, as depicted in FIG. 7B, a NLOS signal having a delay of about 168 m is present with a LOS signal (similar to the multipath environment depicted in FIG. 5), the power contributed to the HRC function of the LOS signal by the NLOS signal (at 168 m delay) is down more than about 40 dB. The relatively small amount of power contributed by the NLOS signal does not adversely impact identification of a LOS signal. The zero crossing of the HRC function is about coincident with the peak of the HRP function. (See FIG. 6A). The HRP and the HRCC functions are similarly resistant to multipath signals. Isolating the LOS signal component from NLOS signal components also may improve the data decoding process. Alternatively or additionally, isolating the LOS signal component may permit the LOS and NLOS signal components to be combined via phase adjustment of the components with respect to each other.

Figure 7C:
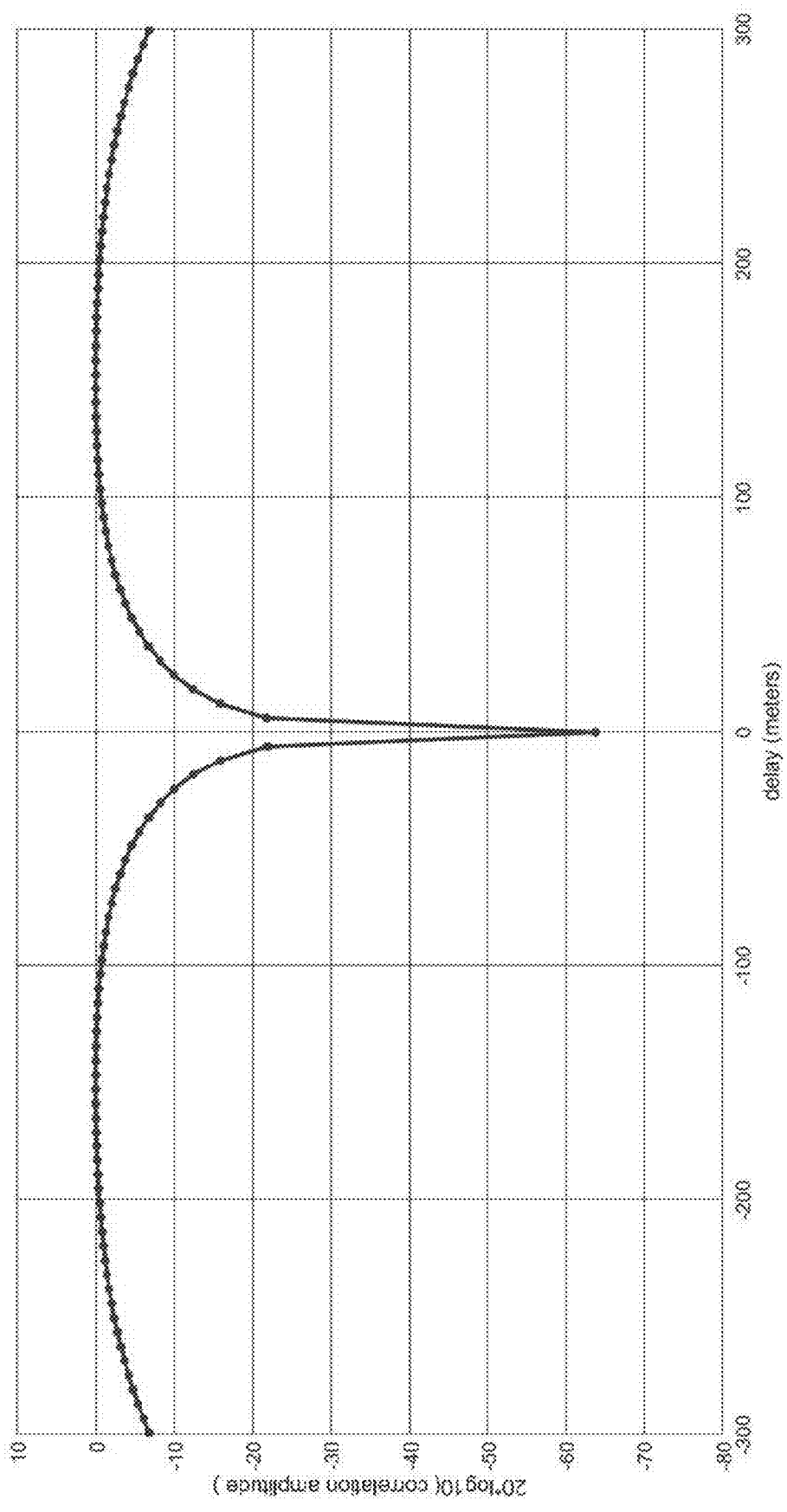
FIG. 7C is a graph that depicts the standard ¼ chip correlation provided by a conventional narrowband GNSS receiver for a LOS signal.
Figure 7D:
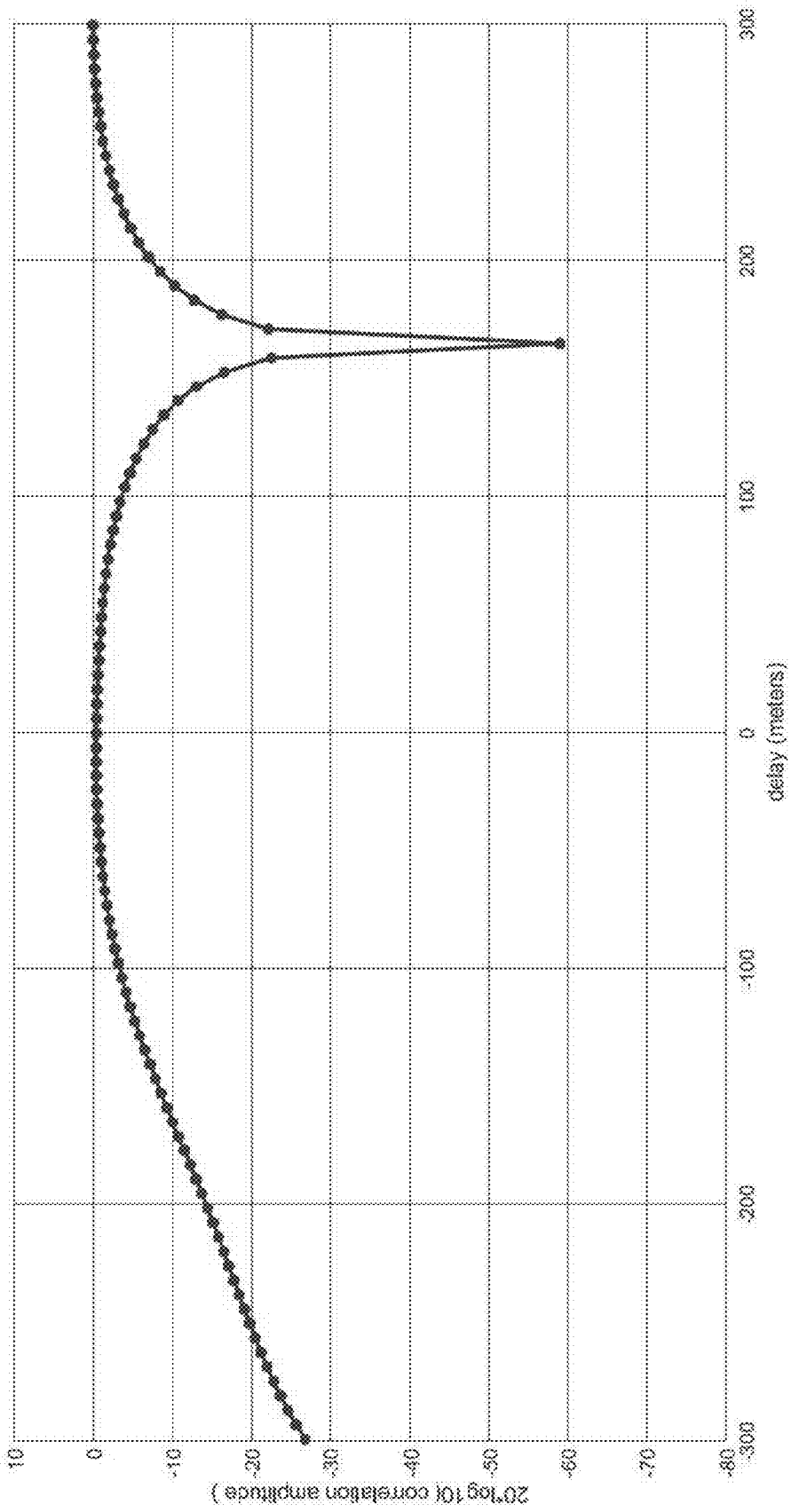
FIG. 7D is a graph that depicts the standard ¼ chip correlation provided by a conventional narrowband GNSS receiver for a LOS signal and a NLOS signal.
Figure 8:
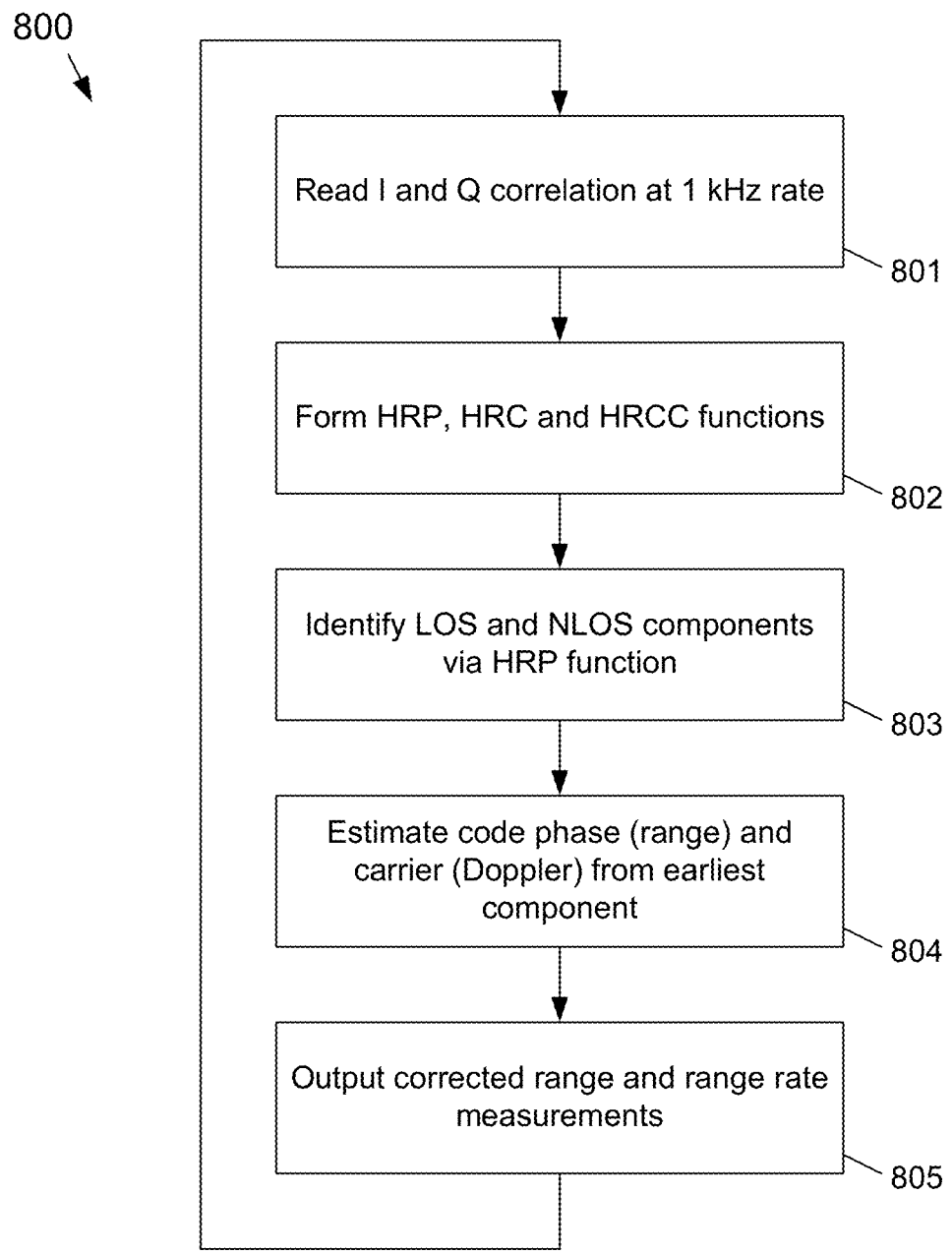
FIG. 8 depicts a flow diagram of a method for mitigating multipath by signal path identification according to the subject matter disclosed herein.

In contrast to FIG. 7A, FIG. 7C is a graph that depicts the standard ¼ chip correlation provided by a conventional narrowband GNSS receiver. At 0 delay with no NLOS signal present, the standard ¼ chip correlation does not include energy from a multipath signal. This can also be observed in FIG. 4D in which the zero crossing of the standard ¼ chip correlation is coincident with 0 delay. If, however, as depicted in FIG. 7D, a NLOS signal having a delay of about 168 meters is present with a LOS signal (similar to the multipath environment depicted in FIG. 5, and like FIG. 7B), the NLOS signal contributes a significant amount of power to the standard ¼ chip correlation, thereby adversely impacting the determination of the LOS signal. That is, the zero crossing of the standard ¼ chip correlation now occurs at about 165 m delay. (See FIG. 6B.) The bandwidth of the narrowband signal path has effectively mixed, or combined, the LOS and NLOS components together so that they cannot be separated and tracked. Additionally, the mixing of LOS and NLOS components interferes with the data decode process, FIG. 8 depicts a flow diagram of a method 800 for mitigating multipath by signal path identification according to the subject matter disclosed herein. At 801, the I and Q correlations are read at, for example, a 1 kHz rate. This rate is a high enough rate that the correlators can be further rotated in to create frequency bins between approximately ±100 Hz, which provides a frequency range that may be searched for multipath in the Doppler domain. In one embodiment, the rotation may be done in software via a complex rotation operation as follows:

$$I_{freq\ out} = I_{corr} \times I_{freq\ bin} + Q_{corr} \times Q_{freq\ bin} \quad (5)$$

$$Q_{freq\ out} = I_{corr} \times Q_{freq\ bin} - Q_{corr} \times I_{freq\ bin} \quad (6)$$

in which $I_{freq\ out}$ and $Q_{freq\ out}$ represent the frequency translated signal, and $I_{freq\ bin}$ and $Q_{freq\ bin}$ represent the numerical representation of the local carrier that is mixed with the incoming signal. Typically, the 1 kHz I and Q correlations may be mixed to carrier frequencies −100, −90, . . . , −10, 0, +10, . . . , +90, +100, which provides a frequency range that covers most of the range associated with automotive Doppler motion. In another embodiment, the rotation may be done in hardware.

At 802, the HRP, HRC and HRCC functions may be formed at each of the frequencies. The nominal center carrier frequency may be ascertained via the narrowband carrier frequency track. Similarly, the nominal correlation code phase window for the wideband channel may be ascertained from the standard narrowband tracking. In this way, the required correlation window and carrier frequency range may be limited. The narrowband channel may be replaced by the wideband channel with standard tracking for this nominal centering function. The HRP function across code phase and carrier frequency may be tested for signal presence by comparing the peak HRP value against a predetermined SNR threshold, which is a standard noise estimation function in GNSS receivers.

The HRP, HRC and HRCC functions may be summed over varying time periods that depends on the received CNO. For example, the HRP, HRC and HRCC functions may be summed over a 100 ms for strong signals (i.e., 40 dB-Hz) to a time period of 5 s for weak signals (i.e., 15 dB-Hz).

At 803, LOS and NLOS may be identified by using the HRP, HRC and/or HRCC functions. Once a LOS or a NLOS signal component has been identified, that signal component may be tracked and/or estimated with respect to time of arrival of the HRP or HRC functions. In the case of the HRC function, the zero crossing of the discriminator may be estimated. The range measurement is then formed via the zero crossing position. This may be performed as an offset from, or correction to, the standard tracking or as a complete range measurement. The LOS signal component may be tracked while performing a continued search for NLOS signal components. In one embodiment, in the event that the LOS component disappears, the continued search for NLOS signal components results in an immediate tracking of the earliest NLOS component. When no LOS is present, the subject matter disclosed herein seeks out the earliest arriving NLOS signal component and improves range and range-rate measurements on the earliest arriving NLOS signal component, thereby improving measurements when no LOS signal component is present.

Individual LOS and NLOS components once identified can be tracked in a feedback loop or just estimated. Multiple measurements may be generated and sent to, for example, the navigation-processing module 123 in FIG. 1.

At 804, the carrier phase/frequency estimate may be formed via the $\tan^{-1}(Q/I)$ (Eq. (4)) based on the HRCC function. Once the phase estimate has been found, the frequency estimate is a standard function via phase change between samples. In the GPS case, there may be phase estimates every 20 ms, the data-bit width, that are then used to form a frequency estimate by computing the phase change between 20 ms samples. Note that a 20 ms coherent integration is described herein as an example, but modern signals have pilot channels that may be coherently integrated for longer. Alternatively, data stripping may be performed on the GPS L1 C/A signal. Either of these approaches may provide coherent integration periods of 100 ms or longer.

A longer coherent integration allows narrower bandwidth correlations to be developed, for example, a 10 Hz bandwidth, thereby allowing a higher differential between LOS and NLOS components in the presence of user motion assuming LOS and NLOS are moving with respect to each other, for example, in a moving vehicle. An advantage provided by maintaining a narrowband signal reception channel is when the wideband channel is overwhelmed by interference.

At 805, the range and range rate as determined using the narrowband signal path may be corrected by the estimates generated using the wideband signal path. In another embodiment, the estimates generated using the wideband signal path may be used alone to generate range and range rate measurements. The process returns to 801.

Figure 9:
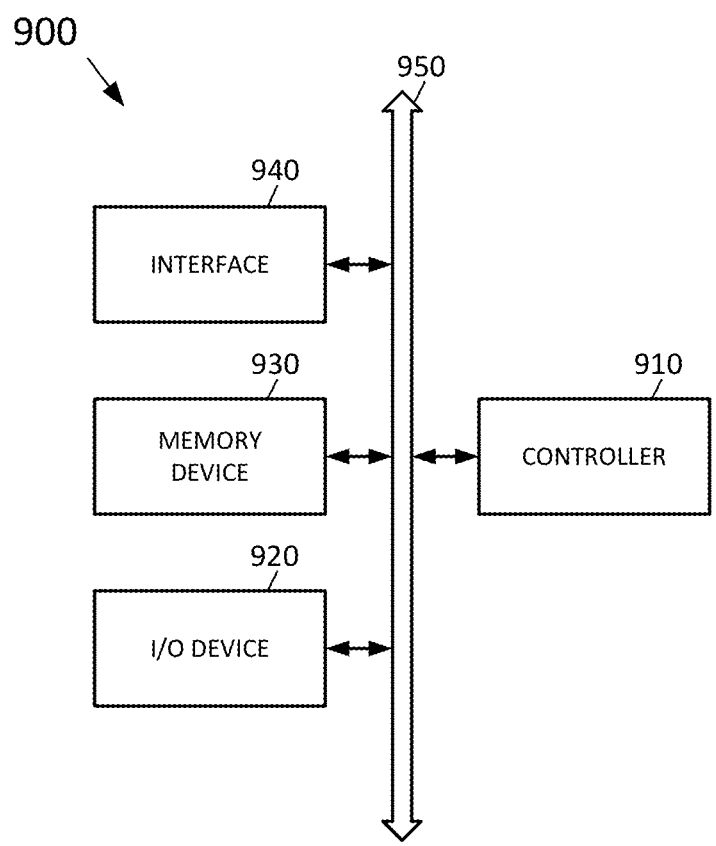
FIG. 9 depicts an electronic device that provides multipath mitigation by identifying signals based on their apparent signal path according to the subject matter disclosed herein.

FIG. 9 depicts an electronic device 900 that provides multipath mitigation by identifying signals based on their apparent signal path according to the subject matter disclosed herein. Electronic device 900 may be used in, but not limited to, a GNSS receiver, a computing device, a personal digital assistant (PDA), a laptop computer, a mobile computer, a web tablet, a wireless phone, a cell phone, a smart phone, a digital music player, or a wireline or wireless electronic device. The electronic device 900 may comprise a controller 910, an input/output device 920 such as, but not limited to, a keypad, a keyboard, a display, a touch-screen display, a camera, and/or an image sensor, a memory 930, and an interface 940 that are coupled to each other through a bus 950. The controller 910 may comprise, for example, at least one microprocessor, at least one digital signal process, at least one microcontroller, or the like. The memory 930 may be configured to store a command code to be used by the controller 910 or a user data. Electronic device 900 and the various system components comprising electronic device 900 may comprise a system that provides multipath mitigation by identifying signals based on their apparent signal path according to the subject matter disclosed herein. The interface 940 may be configured to include a wireless interface that is configured to transmit data to or receive data from a wireless communication network using a RF signal. The wireless interface 940 may include, for example, an antenna, a wireless transceiver and so on. The electronic system 900 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service—Time Division Duplex (UMTS-TDD), High Speed Packet Access (HSPA), Evolution Data Optimized (EVDO), Long Term Evolution—Advanced (LTE-Advanced), Multichannel Multipoint Distribution Service (MMDS), and so forth.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A Global Navigation Satellite System (GNSS) receiver, the receiver comprising:
   a wideband signal correlation module to generate wideband correlation signals of at least one of a plurality of GNSS signals with respect to corresponding locally generated code replica signals, a bandwidth of the wideband signal correlation module being at least about 20 MHz; and
   a multipath-mitigation module to determine a Line of Sight (LOS) signal component from the wideband correlation signals.

2. The receiver of claim 1, further comprising:
   a narrowband signal correlation module to generate narrowband correlation signals of the at least one GNSS signal with respect to corresponding locally generated code replica signals, a bandwidth of the narrowband signal correlation module being less than about 6 MHz;
   wherein the multipath-mitigation module further corrects a range and range-rate measurement generated from the narrowband correlation signals based on a code phase and a carrier estimated based on the LOS signal component.

3. The receiver of claim 1, wherein the at least one GNSS signal comprises a Global Positioning System (GPS) L1 Coarse/Acquisition (C/A) code signal.

4. The receiver of claim 1, wherein the wideband signal correlation module forms correlation signals on a wideband in-phase signal and a wideband quadrature signal for the at least one GNSS signal, and
   wherein the multipath-mitigation module determines the LOS signal component from the correlation of the wideband in-phase signal and the wideband quadrature signal for the at least one GNSS signal.

5. The receiver of claim 1, wherein the multipath-mitigation module determines the LOS signal component based on an earliest-in-time signal component based on the wideband correlation signals.

6. The receiver according to claim 1, wherein the multipath-mitigation module determines the LOS signal component based on a peak value of a high-resolution power (HRP) function and a zero-crossing of a high-resolution code (HRC) function,
   wherein the HRP function comprises:

$HRP(\tau)=|p(\tau)-[p(\tau-n)+p(\tau+n)]|$, in which p is a value of correlation power for a given delay $\tau$, n is a number of samples offset from $\tau$, and the value of p is determined by taking a magnitude of an in-phase (I) correlation and a quadrature (Q) correlation as, $p(\tau)=\sqrt{I(\tau)^2+Q(\tau)^2}$, and wherein the HRC function comprises:

$HRC(\tau)=2[p(\tau-m)+p(\tau+m)]-[p(\tau-2m)+p(\tau+2m)]$, in which p is the value of correlation power for a given delay $\tau$, and m is a number of samples offset from $\tau$.

7. The receiver according to claim 1, wherein the multipath-mitigation module determines the LOS signal component based on a peak value of a high-resolution power (HRP) function and a zero-crossing of a high-resolution carrier component (HRCC) function,
   wherein the HRP function comprises:

$HRP(\tau)=|p(\tau)-[p(\tau-n)+p(\tau-n)]|$, in which p is a value of correlation power for a given delay $\tau$, n is a number of samples offset from $\tau$, and the value of p is determined by taking a magnitude of an in-phase (I) correlation and a quadrature (Q) correlation as, $p(\tau)=\sqrt{I(\tau)^2+Q(\tau)^2}$, and wherein the HRCC function comprises:

$$HRCC(\tau) = \tan^{-1}\left(\frac{Q(\tau)}{I(\tau)}\right),$$

in which $Q(\tau)=Q(\tau)-[Q(\tau-1)+Q(\tau+1)]$ and $I(\tau)=I(\tau)-[I(\tau-1)+I(\tau+1)]$.

8. A Global Navigation Satellite System (GNSS) receiver, the receiver comprising:
   a wideband signal path to form wideband correlations of at least one of a plurality of GNSS signals with respect to corresponding locally generated code replica signals, a bandwidth of the wideband signal path being about 20 MHz; and
   a multipath-mitigation module coupled to the wideband signal path to determine a Line of Sight (LOS) signal component from the wideband correlated signals.

9. The receiver of claim 8, further comprising:
   a narrowband signal path to form narrowband correlations of the at least one GNSS signal with respect to corresponding locally generated code replica signals, a bandwidth of the narrowband signal path being less than about 6 MHz;
   wherein the multipath-mitigation module is further coupled to the narrowband signal path, the multipath-mitigation module further determining a range and range-rate measurement from the narrowband correlated signals, and correcting the range and range-rate measurement generated from the narrowband correlated signals based a code phase and a carrier estimated from the LOS signal component.

10. The receiver of claim 8, wherein the at least one GNSS signal comprises a Global Positioning System (GPS) L1 Coarse/Acquisition (C/A) code signal.

11. The receiver according to claim 8, wherein the multipath-mitigation module determines the LOS signal component based on a peak value of a high-resolution power (HRP) function and a zero-crossing of a high-resolution code (HRC) function, wherein the HRP function comprises:

$$HRP(\tau)=|P(\tau)-[p(\tau-n)+p(\tau+n)]|,$$

in which p is a value of correlation power for a given delay $\tau$, n is a number of samples offset from $\tau$, and the value of p is determined by taking a magnitude of an in-phase (I) correlation and a quadrature (Q) correlation as, $$p(\tau)=\sqrt{I(\tau)^2+Q(\tau)^2}, \text{ and}$$

wherein the HRC function comprises:

$$HRC(\tau)=2[p(\tau-m)+p(\tau+m)]-[p(\tau-2m)+p(\tau+2m)],$$

in which p is the value of correlation power for a given delay $\tau$, and m is a number of samples offset from $\tau$.

12. The receiver according to claim 8, wherein the multipath-mitigation module determines the LOS signal component based on a peak value of a high-resolution power (HRP) function and a zero-crossing of a high-resolution carrier component (HRCC) function, wherein the HRP function comprises:

$$HRP(\tau)=|P(\tau)-[p(\tau-n)+p(\tau+n)]|,$$

in which p is a value of correlation power for a given delay $\tau$, n is a number of samples offset from $\tau$, and the value of p is determined by taking a magnitude of an in-phase (I) correlation and a quadrature (Q) correlation as, $$p(\tau)=\sqrt{I(\tau)^2+Q(\tau)^2}, \text{ and}$$

wherein the HRCC function comprises:

$$HRCC(\tau) = \tan^{-1}\left(\frac{Q(\tau)}{I(\tau)}\right),$$

in which $Q(\tau)=Q(\tau)-[(\tau-1)+Q(\tau+1)]$ and $I(\tau)=I(\tau)-[I(\tau-1)+I(\tau+1)]$.

* * * * *